July 24, 1962 P. G. TURNER ETAL 3,045,328
MANUFACTURE OF HOLLOW TURBINE BLADES
Filed May 7, 1957
FIG./.
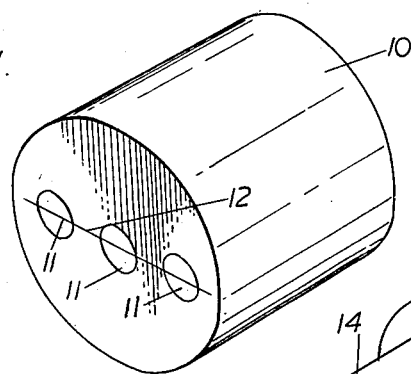
FIG.2.
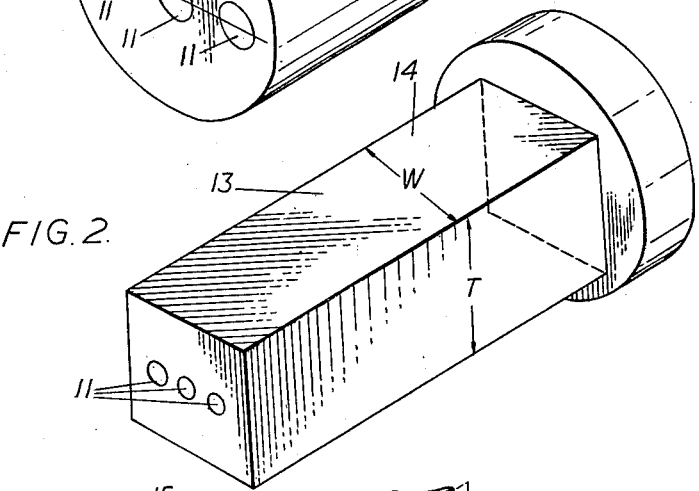
FIG.3.
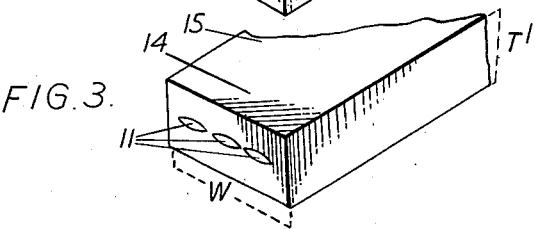
FIG.4.
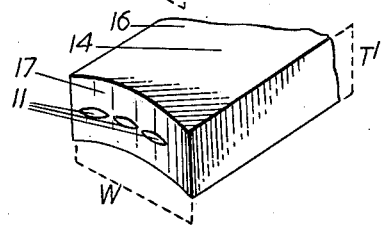
FIG.5.
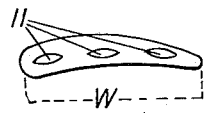
PHILIP GEORGE TURNER
CAMPBELL CLOUSTON HORNE
*Inventors*
By *C. Fr. Deller*
*Attorney*

_United States Patent Office_

3,045,328
Patented July 24, 1962

3,045,328
MANUFACTURE OF HOLLOW TURBINE BLADES
Philip G. Turner, Inkberrow, England, and Campbell C. Horne, Giffnock, Scotland, assignors to The International Nickel Company, Inc., New York, N.Y., a corporation of Delaware
Filed May 7, 1957, Ser. No. 657,553
Claims priority, application Great Britain May 8, 1956
9 Claims. (Cl. 29—156.8)

The present invention relates to the production of hollow turbine blades and, more particularly, to the production of hollow turbine blades having a plurality of cooling passages of substantially uniform elliptical cross section.

Turbine bades having cooling passages extending parallel to one another from the root to the tip can be made by extruding a metal billet having a number of holes filled with a filler, so that during the extrusion, the filler flows with the metal and the holes become elongated and reduced in cross sectional area and, subsequently removing the filler. The product of the extrusion is not the finished blade but rather either a blank, or a strip which can be cut to form a number of blanks, and each blank is machined to the desired final shape and size. The advantage of the extrusion process is that it enables the very small passages required to be produced. The manufacturers of gas turbines now require cooling passages that are elliptical or approximately elliptical in cross section, particularly in the thinnest parts of the blade, where cooling is most required. The holes in the original billet are commonly made by drilling and so are circular in cross section. The problem is to transform all of them to substantially ellpitical shape of substantialy constant axis ratio.

If the original billet is cylindrical or quasi cylindrical and is extruded through a rectanguar die orifice having two parallel sides longer than the other two, filled holes near the center of the billet or the long sides of the rectangular extruded product will become more or less elliptical, but those near the short sides of the extruded product tend to be circular in cross section; it is, however, just these which should be elliptical. On the other hand, if the original billet is rectangular and is extruded to a similarly orientated similar rectangular shape of smaller cross sectional area or a cylindrical billet extruded to a parallelepiped of square section, filled holes lying on or close to a center line (if the billet is square) or to the longer center line (if the billet has sides of unequal length) all tend to be of circular cross section in the extruded product.

Although many attempts were made to overcome the foregoing difficulties and other disadvantages, none, as far as we are aware, was entirely successful when carried into practice commercially on an industrial scale.

It has now been discovered that by making a turbine blade blank of a requisite size and form in cross sectional area and reducing this in one dimension hollow turbine blades may be produced, each having a plurality of internal passages having a substantially uniform elliptical cross section across the section of the blade.

It is an object of the present invention to provide a process for the production of turbine blade blanks having a plurality of passages of substantially uniform elliptical cross section.

Another object is to provide a process for the production of hollow turbine blades having a plurality of passages having a substantially uniform elliptical cross section.

Other objects and advantages will become apparent from the following description taken in conjunction with the drawing in which:

FIGURE 1 is an external view of a cylindrical billet having filled round holes;

FIGURE 2 depicts the cylindrical billet of FIGURE 1 after being partially extruded through a square die;

FIGURE 3 shows the billet of FIGURE 2 after being rolled to give a parallelepiped of rectangular cross section;

FIGURE 4 shows the product of rolling to give a cambered section; and

FIGURE 5 is a cross sectional view of an arcuate cross section as required in turbines.

Generally speaking, the present invention may be achieved by a process for the production of a turbine blade blank comprising two stages. First, a cylindrical billet having filled axial holes of circular cross section lying on a diameter, or on an arc closely approximating a diameter, is so extruded to substantially square section that the said diameter becomes substantially a center line of the square, i.e., a line joining the centers of two opposite sides. The filled holes are, of course, reduced in cross sectional area, but they remain substantially circular. Alternatively, this first stage may comprise drilling circular holes substantially on the center line of a billet of square cross section and filling these holes with the filler material. In the next stage the product of the first stage is rolled, forged or extruded to elongate it and rdeuce its thickness T while maintaining its width W, i.e., said center line substantially unchanged. This stage may most conveniently comprise rolling between flanged rolls or extrusion. During this stage the shape of the filled holes changes to substantially elliptical, and the ratio of the elliptical axes is approximately the same in all the holes. The elongated product need not be rectangular in section as camber can be imparted to it during the rolling or other process employed to reduce the cross section thereof. Thereafter, the elongated product can be cut into smaller sections forming turbine blade blanks and may be machined, etc., to form finished blades.

In carrying the invention into practice, it is preferred to produce the turbine blades or turbine blade blanks from a cylindrical billet of heat-resistant metal. Referring now to the drawing, FIGURE 1 shows a cylindrical billet 10 with filled holes 11 of circular cross section lying substantially on a diameter 12. The holes are filled with an appropriate filler material. FIGURE 2 shows the billet after partial extrusion through a square die to produce a parallelepiped 13, having a square section such that the square has a side 14 substantially equal in width W to the chord of the final blade form and a thickness T which is equal to W. Filled holes 11 are still substantially circular in section but are of reduced area. Parallelepiped 13 is then reduced, e.g., by rolling, to rectangular section as shown by the parallelepiped 15 of FIGURE 3 wherein side 14 thereof has the same width W as the corresponding side 14 of parallelepiped 13 shown in FIGURE 2 but the thickness T' is considerably smaller than T. Filled holes 11 have now changed their form from circular cross section to pseudo-elliptical cross section with the same ellipse ratio across the section. Parallelepiped 13 may, alternatively, be rolled through cambered rolls to provide the cambered product 16 having a cambered cross section 17. Side 14 again has substantially the same width W as side 14 which was shown in FIGURE 2 while again T' is considerably smaller than T. The machined cross section of the final blade is shown in FIGURE 5 wherein pseudo-elliptical holes 11 have substantially the same ellipse ratio across the section, i.e., each of holes 11 has substantially the same shape regardless of its location in the section. The airfoil section is produced by machining from the reduced section shown in FIGURE 3 which is curved by forging prior to the said machining operation. The airfoil may be machined directly from the cambered section of FIGURE 4 of a root forged at one extremity.

With respect to the manufacture of turbine blades by means of the novel process, it should be understood that the term "heat-resistant metal" refers to austenitic nickel-chromium alloys which include nickel-chromium-iron and nickel-chromium-cobalt alloys, and cobalt-chromium alloys including cobalt-chromium-iron alloys which contain at least about 25% nickel plus chromium, cobalt plus chromium or nickel plus cobalt plus chromium in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and accordingly must be hot worked at temperatures around 1200° C. When using said heat-resistant, hot-workable metals, a filler material such as a ferritic titanium-containing manganese steel or a metal-ceramic mixture such as an iron-magnesia mixture may be used as the filler material. These fillers may be conveniently removed from the heat-resistant, hot-workable metal by leaching with acid. Suitable filler materials and their use are described in Hignett U.S. application Serial No. 472,755, now U.S. Patent No. 2,941,281, and Betteridge U.S. application Serial No. 509,380, now U.S. Patent No. 2,891,307.

For the purpose of giving those skilled in the art a better understanding of the invention, the following illustrative example is given:

*Example I*

A cylindrical billet 4 inches diameter x 6 inches long made of a nickel-chromium-cobalt alloy is drilled as shown in FIGURE 1 with three holes ⅜ inch diameter. The holes are each filled with a filler rod of ferritic titanium-containing manganese steel. The composite billet is then heated to 1200° C. and extruded through a die orifice of square section of 1¾ inch side. The reduction of area is approximately 4:1 and the diameter of each one of the filled holes is approximately 3⁄16 inch. The extruded product appears as shown in FIGURE 2 and this is extruded at 1200° C. through a die orifice of 1¾ inches x 1 inch of rectangular form. The filled holes now assume a pseudo-elliptical form of major axis 3⁄16 inch and a minor axis of $$\frac{1¾ \times 1 \times 3⁄16}{1¾ \times 1¾} = \frac{7}{64} \text{ inch}$$

It will be appreciated that if we call the areas of the sections shown in FIGURES 1, 2 and 3 respectively $A_1$, $A_2$, $A_3$ and the area of each filled hole in FIGURES 1, 2 and 3 respectively $a_1$, $a_2$, $a_3$, then $$\frac{A_1}{a_1} \approx \frac{A_2}{a_2} \approx \frac{A_3}{a_3}$$

If the diameter of each hole of area $a_2$ (FIGURE 2) is $d$, then $a_2 = \pi d^2/4$ and if the axes of each hole of area $a_3$ (FIGURE 3) is $m$ (major) and $n$ (minor) then $a_3 = \pi/4 \, mn$. Since the widths $A_2$ and $A_3$ are unchanged $m = d$.

$$a_3 = \frac{\pi}{4} dn \text{ and } \frac{a_2}{a_3} = \frac{d}{n}$$

also $$n = \frac{A_3 d}{A_2}$$

It is to be pointed out that the cross sectional area of the original billet and the cross sectional area of the die should not exceed the ratio of 12:1. With a cylindrical billet of more than 7-inch diameter the flow is we find not always regular and we prefer to make this an upper limit to its size. In most turbine blade applications a 5-inch diameter billet is quite satisfactory.

We claim:

1. A process for the production of a turbine blade blank containing a plurality of passages of substantially elliptical cross section having substantially identical ellipse ratios across the section of said blade blank which comprises axially extruding a circular billet having a plurality of filled axial holes of circular cross section lying substantially along a diameter, through a square section die so that said diameter along which said holes are located becomes substantially the center line of the square section and thereafter mechanically working said extruded product to elongate said product and to reduce the cross section thereof without substantially changing the dimension along said center line and without changing the total volume of metal.

2. A process for the production of a turbine blade blank containing a plurality of passages of substantially elliptical cross section having substantially identical ellipse ratios across the section of said blade blank which comprises axially extruding a circular billet, having a plurality of filled axial holes of circular cross section lying substantially along a diameter, through a square section die so that the diameter along which said holes are located becomes substantially the center line of the square section and thereafter mechanically working said extruded product to elongate said product and to reduce the same to a rectangular cross section without substantially changing the dimension along said center line and without changing the total volume of metal.

3. A process for the production of a turbine blade blank containing a plurality of passages of substantially elliptical cross section having substantially identical ellipse ratios across the section of said blade blank which comprises axially extruding a circular billet, having a plurality of filled axial holes of circular cross section lying substantially along a diameter, through a square section die so that the diameter along which said holes are located becomes substantially the center line of the square section, mechanically working said extruded product to elongate said product and to reduce the same to a rectangular cross section without substantially changing the dimension along said center line and without changing the total volume of metal and thereafter sectioning the reduced extruded product.

4. A process as set forth and described in claim 3 wherein the sectioned reduced extruded product is machined to substantially airfoil section.

5. A process for the production of a turbine blade blank containing a plurality of passages of substantially elliptical cross section having substantially identical ellipse ratios across the section of said blade blank which comprises extruding a circular billet, having a plurality of filled axial holes of circular cross section lying substantially along a diameter, through a square section die so that the diameter along which said holes are located becomes substantially the center line of the square section and thereafter mechanically working said extruded product to elongate said product and to reduce the same to a cambered cross section without substantially changing the dimension along said center line and without changing the total volume of metal.

6. A process for the production of a turbine blade blank containing a plurality of passages of substantially elliptical cross section having substantially identical ellipse ratios across the section of said blade blank which comprises extruding a circular billet, having a plurality of filled axial holes of circular cross section lying substantially along a diameter, through a square section die so that the diameter along which said holes are located becomes substantially the center line of the square section, mechanically working said extruded product to elongate said product and to reduce the same to a cambered cross section without substantially changing the dimension along said center line and without changing the total volume of metal and thereafter sectioning the reduced extruded product.

7. A process as set forth and described in claim 6 wherein the sectioned reduced extruded product is machined to substantially airfoil section.

8. A process for the production of a turbine blade blank containing a plurality of passages of substantially elliptical cross section which comprises axially extruding a circular billet, having a plurality of filled axial holes of circular cross section lying substantially along a diameter, through a square section die so that said diameter becomes substantially the center line of the square section and said holes remain substantially circular and thereafter mechanically working said extruded product to elongate said product and to reduce the cross section thereof without substantially changing the dimension along said center line and without changing the total volume of metal.

9. A process for the production of a turbine blade blank containing a plurality of passages of substantially elliptical cross section having a substantially constant axis ratio across any cross section which comprises axially extruding a circular billet, having a plurality of filled axial holes of circular cross section lying substantially along a diameter, through a square section die so that said diameter becomes substantially the center line of the square section and thereafter mechanically working said extruded product to elongate said product and to reduce the cross section thereof without substantially changing the dimension along said center line and without changing the total volume of metal.

References Cited in the file of this patent

UNITED STATES PATENTS

| | | |
|---|---|---|
| 1,878,240 | Hoy | Sept. 20, 1932 |
| 2,013,622 | Bedford et al. | Sept. 3, 1935 |
| 2,628,417 | Peyches | Feb. 17, 1953 |

FOREIGN PATENTS

| | | |
|---|---|---|
| 755,610 | Great Britain | Aug. 22, 1956 |
| 763,141 | Great Britain | Dec. 5, 1956 |
| 517,991 | Canada | Nov. 1, 1955 |